United States Patent [19]

DenHartog et al.

[11] Patent Number: 4,529,765

[45] Date of Patent: Jul. 16, 1985

[54] COATING COMPOSITION OF AN ACRYLIC POLYMER HAVING ETHYLENICALLY UNSATURATED GROUPS AND AN ACRYLIC POLYMER HAVING PRIMARY AMINE GROUPS

[75] Inventors: Herman C. DenHartog, Pontiac; Aloysius N. Walus, Troy, both of Mich.

[73] Assignee: E. I. Du Pont de Nemours and Company, Wilmington, Del.

[21] Appl. No.: 598,477

[22] Filed: Apr. 9, 1984

[51] Int. Cl.³ ............... C08K 5/09; C08K 5/10; C08K 5/06; C09D 3/80

[52] U.S. Cl. ............... 524/294; 524/83; 524/315; 524/317; 524/512; 524/513; 524/516; 524/517; 524/521; 524/522; 524/523; 525/204; 525/208; 525/218; 525/327.3; 525/375; 525/378; 525/910; 525/912

[58] Field of Search ............... 524/294, 512, 513, 522, 524/523, 517, 516, 521; 525/910, 912, 204, 375, 378, 327.3, 208, 218

[56] References Cited

U.S. PATENT DOCUMENTS

| | | | |
|---|---|---|---|
| 3,280,218 | 10/1966 | Endsley et al. | 260/874 |
| 3,290,416 | 12/1966 | Christenson et al. | 260/901 |
| 3,290,417 | 12/1966 | Christenson et al. | 260/901 |
| 3,654,106 | 6/1972 | Wagner et al. | 204/159.23 |
| 3,844,916 | 10/1974 | Gaske | 204/159.16 |
| 3,883,483 | 5/1975 | Anderson et al. | 260/77.5 TB |
| 3,914,165 | 10/1975 | Gaske | 204/159.14 |
| 3,925,349 | 12/1975 | Gaske | 204/159.15 |
| 3,953,391 | 4/1976 | Dowbenko et al. | 260/29.6 TA |
| 3,975,251 | 11/1976 | McGinniss | 204/181 |
| 4,020,123 | 4/1977 | Trapasso | 260/837 R |
| 4,020,216 | 4/1977 | Miller | 524/513 |
| 4,096,105 | 6/1978 | McGinniss | 260/29.6 NR |
| 4,104,230 | 8/1978 | Chang et al. | 260/29.6 NR |
| 4,147,674 | 4/1979 | Vasta | 524/549 |
| 4,174,332 | 11/1979 | Honig et al. | 260/29.2 EP |
| 4,198,331 | 4/1980 | Buchwalter et al. | 260/29.2 EP |
| 4,211,691 | 7/1980 | FitzGerald | 260/42.21 |
| 4,248,753 | 2/1981 | Buchwalter et al. | 260/29.2 TN |
| 4,284,776 | 8/1981 | Gruber et al. | 544/500 |
| 4,316,784 | 3/1981 | Buchwalter et al. | 204/181 C |
| 4,330,640 | 5/1982 | Buchwalter | 524/555 |
| 4,414,068 | 11/1983 | Patricca et al. | 524/512 |

Primary Examiner—Herbert J. Lilling
Attorney, Agent, or Firm—Hilmar L. Fricke

[57] ABSTRACT

A coating composition which cures at ambient temperatures of 20–80% by weight of a binder and 80–20% by weight of a solvent for the binder, the binder contains:

A. an acrylic amino ester polymer of polymerized monomers of methyl methacrylate and monomers from the group of alkyl methacrylate and alkyl acrylate each having 2–12 carbon atoms in the alkyl group and the polymer has pendent amino ester or hydroxy amino ester groups wherein the amine group is a primary; and B. an acrylic polymer that has pendent polymerizable ethylenically unsaturated groups;

the polymers having a weight average molecular weight of 6,000–80,000 determined by gel permeation chromotography;

the composition is a two-component composition in which the acrylic amino ester polymer is blended with the acrylic polymer having pendent polymerizable groups before application; on application the amino groups of the acrylic amino ester polymer react with the polymerizable groups of the acrylic polymer and form a crosslinked finish;

the composition is useful as an exterior finish for automobiles and trucks and for repairing finishes of automobiles and trucks.

11 Claims, No Drawings

COATING COMPOSITION OF AN ACRYLIC POLYMER HAVING ETHYLENICALLY UNSATURATED GROUPS AND AN ACRYLIC POLYMER HAVING PRIMARY AMINE GROUPS

BACKGROUND OF THE INVENTION

This invention is related to a coating composition and in particular to a coating composition that cures at ambient temperatures.

Many currently available coating compositions used to finish and repair the exterior finishes of trucks and automobiles contain isocyanate compounds.

These compositions cure at ambient temperatures and provide finishes with good physical properties such as gloss, hardness, weatherability, good adhesion, chip resistance and the like. Typical compositions are shown in Crawley et al. U.S. Pat. No. 4,131,571 issued Dec. 26, 1978, Miller U.S. Pat. No. 4,020,216 issued Apr. 26, 1977, Miller U.S. Pat. No. 3,844,993 issued Oct. 29, 1974, Miller U.S. Pat. No. 3,789,037 issued Jan. 29, 1974 and Vasta U.S. Pat. No. 3,558,564 issued Jan. 26, 1971. It would be desirable to provide an ambient temperature curing composition that does not contain an isocyanate compound but has all of the good properties of the aforementioned compositions.

The novel coating composition of this invention does not contain isocyanate compounds and cures at ambient temperatures and provides finishes that have excellent physical properties and are durable and are useful particularly as exterior finishes of automobiles and trucks.

SUMMARY OF THE INVENTION

A coating composition containing about 20–80% by weight of a binder and 80–20% by weight of a solvent for the binder, wherein the binder contains A. an acrylic amino ester polymer of polymerized monomers of methyl methacrylate and monomers from the group of alkyl methacrylate or alkyl acrylate, each having 2–12 carbon atoms in the alky group, and the polymer has pendent amino ester or hydroxy amino ester groups wherein the amine group is primary; and B. an acrylic polymer having pendent polymerizable ethylenically unsaturated groups;

the polymers have a weight average molecular weight of about 6,000–8,000 determined by gel permeation chromatography using polymethyl methacrylate as a standard.

DETAILED DESCRIPTION

The coating composition contains about 20–80% by weight of binder and 80–20% by weight of a solvent for the binder. The binder is a blend of about 50–90% by weight of an acrylic amino ester polymer and 10–50% by weight of acrylic polymer having pendent polymerizable ethylenically unsaturated groups. The composition can contain pigments in a pigment-to-binder weight ratio of about 1:100–200:100.

The acrylic amino ester polymer is composed of polymerized monomers of methyl methacrylate, alkyl methacrylate, alkyl acrylate or mixtures thereof each having 2–12 carbon atoms in the alkyl group and has pendent amino ester groups or hydroxy amino ester groups. The polymer has a weight average molecular weight of about 6,000 to 80,000 and preferably 50,000–70,000.

Molecular weight is determined by gel permeation chromatography using polymethyl methacrylate as the standard.

One method for preparing the acrylic amino ester polymer is to polymerize monomers of methyl methacrylate, alkyl methacrylate, alkyl acrylate or mixtures thereof and methacrylic acid or acrylic acid and then post react the carboxyl groups of the resulting polymer with an alkylene iminie to form pendent amino ester groups from the backbone of the polymer.

The polymerization of the monomers to form the acrylic polymer is carried out by conventional techniques in which the monomers, solvents and polymerization catalyst are charged into a polymerization vessel and reacted at about 50°–175° C. for about 0.5–6 hours to form the polymer.

Typical polymerization catalysts that are used are azobisisobutyronitrile, azo-bis(gamma dimethyl valeronitrile), and the like.

Typical solvents used are toluene, xylene, ethyl acetate, acetone, methyl ethyl ketone, methyl isobutyl ketone, ethanol, isopropanol ethylene glycol monoethyl ether acetate and other aliphatic, cycloaliphatic and aromatic hydrocarbon esters, ethers, ketones, and alcohols as are conventionally used.

One preferred acrylic amino ester polymer contains about 75–85% by weight methyl methacrylate, 8–24% by weight ethyl acrylate, and 1–7% by weight methacrylate acid which polymer has been post reacted with an alkylene imine such as propylene imine to provide amino ester groups pendent from the carbon-carbon polymer backbone of the formula

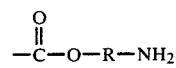

where R is an alkylene group having 2–3 carbon atoms.

In an alternative method for preparing the acrylic polymer, monomers of methyl methacrylate, alkyl methacrylate, alkyl acrylate or mixtures thereof and glycidyl methacrylate or glycidyl acrylate are polymerized using the above solvents, polymerization catalyst and procedure. The resulting polymer and ammonia are charged into a pressure vessel and heated to about 80°–150° C. and maintained at a pressure of about 14–35 kilograms per square centimeter (approximately 200–500 pounds per square inch) for about 1 to 8 hours or until all of the glycidyl groups have been reacted with ammonia.

After the reaction of ammonia with the glycidyl groups of the polymer is completed, excess free ammonia is vacuum stripped off. The resulting polymer has hydroxy amino ester groups pending from the backbone of the polymer.

A preferred acrylic polymer prepared by the alternative method contains about 40–50% by weight methyl methacrylate, 25–45% by weight of an alkyl acrylate or methacrylate such as butyl methacrylate or lauryl methacrylate and 5–20% by weight glycidyl methacrylate or glycidyl acrylate that has been reacted with ammonia to form hydroxy amino ester groups pendent from the carbon-carbon polymer backbone of the formula

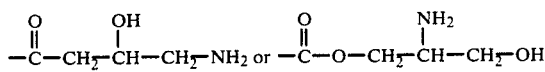

The acrylic polymer having pendent polymerizable ethylenically unsaturated groups is composed of polymerized monomers of methyl methacrylate, an alkyl acrylare or an alkyl methacrylate, each having 2–12 carbon atoms in the alkyl group, a hydroxy alkyl acrylate or hydroxy alkyl methacrylate, each having 2–4 carbon atoms in the alkyl group and an isocyanato alkyl methacrylate or acrylate having 2–4 carbon atoms in the alkyl group. The isocyanato group reacts with the hydroxyl groups to form a polymer with pendent ethylenically polymerizable unsaturated groups. One particularly useful polymer contains 25–85% by weight methyl methacrylate, 7–40% by weight alkyl methacrylate or alkyl methacrylate having 2–12 carbon atoms in the alkyl groups such as butyl methacrylate, 2–20% by weight of hydroxy alkyl acrylate having 2–4 carbon atoms in the alkyl group such as hydroxy ethyl acrylate or hydroxy alkyl methacrylate having 2–4 carbon atoms in the alkyl group such as hydroxy ethyl methacrylate and 1–15% by weight of 2-isocyanato ethyl methacrylate or acrylate and has a calculated weight average molecular weight of about 5,000 to 15,000 and a calculated number average molecular weight of about 4,000–6,000.

Typical alkyl methacrylate and alkyl acrylate monomers that are used to prepare the aforementioned polymers are ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like.

Typical hydroxy alkyl methacrylate and hydroxy alkyl acrylates used to prepare the acrylic polymer are hydroxy ethyl acrylate, hydroxy propyl acrylate, hydroxy butyl acrylate, hydroxy ethyl methacrylate, hydroxy propyl methacrylate, hydroxy butyl methacrylate and the like.

The isocyanato alkyl methacrylate or acrylate used to prepare the acrylic polymer have 2 to 8 carbon atoms in the alkyl group and include isocyanato ethyl acrylate, isocyanato ethyl methacrylate, isocyanato butyl acrylate, isocyanato butyl methacrylate, isocyanato hexyl acrylate, isocyanato hexyl methacrylate isocyanato octyl acrylate isocyanato ethyl hexyl methacrylate and the like. Isocyanato ethyl methacrylate is preferred from the standpoint of availability and ease of copolymerization. Mixtures of the aforementioned monomers can be used.

Styrene can be used in either the acrylic amino ester polymer or in the acrylic polymer containing pendent polymerizable ethylenically unsaturated groups. Styrene can replace a portion or all of the methyl methacrylate or alkyl methacrylate. About 5–50% by weight of styrene can be used in either the acrylic amino ester polymer or the acrylic polymer.

The acrylic polymer is prepared by using the same solvents, polymerization catalyst and reaction temperatures as used to form the above acrylic amino ester polymer. The isocyanato component is added after forming the acrylic portion of the polymer with conventional catalyst such as dibutyltindilaurate.

As mentioned before, the composition can contain pigments. These pigments can be introduced into the composition by first forming a mill base with the acrylic aminoester polymer utilized in the composition or with other compatible polymers or polymer dispersants by conventional techniques, such as sand-grinding, ball milling, attritor grinding, two roll milling to disperse the pigments. The mill base is blended with the film-forming constitutents as shown in the following Examples.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

To improve weatherability of finishes of the coating composition about 0.1–5%, by weight, based on the weight of the binder, of an ultraviolet light stabilizer or a combination of ultraviolet light stabilizers can be added.

Typically useful ultraviolet light stabilizers are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',4'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

One preferred combination of ultraviolet light stabilizer is a benzotriazole and a hindered amine light stabilizer and is preferably used in a weight ratio of about 1:1. The combination is used in an amount of about 1–4% by weight, based on the weight of the binder. One preferred benzotriazole is "Tinuvin" 328, 2-(2 hydroxy-3,5-ditertiary amyl-phenol)-2H-benzotriazole and a preferred hindered amine is "Tinuvin" 292, bis(1,2,2,6,6-pentamethyl-4 piperidinyl)sebacate. Another preferred hindered amine is "Tinuvin" 770, di[4(2,2,6,6 tetramethyl piperdinyl)]sebacate.

Plasticizers in amounts up to 10% by weight based on the weight of binder, can be used in the coating composition. Typical plasticizers that can be used are benzylbutyl phthalate, dibutyl phthalate, triphenyl phosphate, 2-ethyhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl-hexyl ester of hexamethylene diphthalate, di(methylcyclohexyl) phthalate, di(methylcyclohexyl)phthalate one preferred plasticizer of this group is butyl benzyl phthalate since it forms a coating with excellent balance of properties.

The composition generally is distributed to users as a two component composition in which the components are mixed together shortly before application. Component A contains a solution of the acrylic amino ester polymer and component B contains a solution of the acrylic polymer having pendent polymerizable ethylenically unsaturated groups. A separate colored pigment dispersion is usually added to form a pigmented coating composition. The resulting composition has a "pot" life of about 2 to 24 hours at ambient temperatures before viscosity increases or gelling occurs. When the composition is applied to a substrate, reaction occurs between the amino ester group of the acrylic amino ester polymer and the ethylenically unsaturated group of the acrylic polymer to form a crosslinked finish on the substrate which dries at ambient temperatures in about 1–4 hours and fully cures in about 4–7 days to form a hard, glossy, durable, weatherable finish that has excellent adhesion under dry and wet conditions. Also, the coating can be baked at relatively low temperatures of about 65°–140° C. for about 15 minutes–2 hours. The resulting finish is about 0.1–5 mils thick but for most uses, a 1–3 mil thick finish is used.

In general, the coating composition can be applied over a variety of substrates, such as metal, wood, glass, plastic, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solds content which keeps air pollution at a minimum level.

One application that is used to insure that there will be no popping or cratering of the coating is to allow the solvents to flash off for about 15–30 seconds before a second coating is sprayed on or otherwise applied, then waiting from about 2–10 minutes before baking the coating to allow any residual solvents to flash off if the coating is to be baked. The cured finish resulting from application of the composition can be rubbed or polished with conventional techniques to improve the smoothness, appearance and gloss. All of the aforementioned characteristics of the composition make it particularly useful as a finish for automobiles, trucks, airplanes, railroad equipment and particularly useful for the repair of finishes of trucks and automobiles.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention or of another coating composition and the color is the coating composition of this invention and contains pigments in a pigment-to-binder ratio of about 1/100 to 150/100 and other additives.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–2.0 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015–50 microns. Typical pigments that can be used in a pigment-to-binder weight ratio of about 1/100 to 10/100 are inorganic siliceous pigments, such as silica pigments. These pigments have a refractive index of about 1.4.–1.6. To form a durable finish, the clear coat and optionally, the color coat contain about 0.1–5% by weight based on the weight of the binder, of an ultraviolet light stabilizer.

The clear coat color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following Examples illustrate the invention. All parts and percentages are on a weight basis unless otherwise indicated. The weight average molecular weights are determined by gel permeation chromatography using polymethyl methacrylate as a standard.

EXAMPLE

The following acrylic polymer having pendent ethylenically unsaturated group was prepared by charging the following constituents into a polymerization vessel equipped with a stirrer, thermometer and reflux condenser.

|  | Parts by Weight |
|---|---|
| Portion 1 | |
| Ethylene glycol monoethyl ether acetate | 200.0 |
| Toluene | 172.0 |
| Portion 2 | |
| Methyl methacrylate monomer | 360.0 |
| Butyl methacrylate monomer | 138.0 |
| Hydroxy ethyl acrylate monomer | 160.0 |
| Azobis(isobutyronitrile) | 15.0 |
| Portion 3 | |
| Ethyl acetate | 308.0 |
| Portion 4 | |
| 2-Isocyanatoethyl methacrylate monomer | 42.0 |
| Ethyl acetate | 58.0 |
| Dibutyltin dilaurate | 0.6 |
| Total | 1453.6 |

Portion 1 is charged into the polymerization vessel and heated to its reflux temperature. Portion 2 is premixed and added at a uniform rate to the vessel over a 3 hour period while maintaining the resulting reaction mixture at its reflux temperature and after portion 2 was added, the reaction mixture was held at its reflux temperature for an additional 1½ hours. Portion 3 is added. Portion 4 is premixed and added and the reaction mixture is held at an elevated temperature for 2 hours and then cooled to ambient temperature.

The resulting acrylic polymer solution had a theoretical solids of 45% and a Gardner Holdt viscosity measured at 25° C. of about A+½. The polymer has the following composition 60% methyl methacrylate, 23% butyl methacrylate, 10% hydroxy ethyl acrylate, 7% isocyanotoethyl methacrylate and has a weight average molecular weight of of about 10,000.

A dispersing acrylic resin solution was prepared by following the procedure of Example 1 of Miller U.S.

Pat. No. 3,844,993. The resulting solution has a 55% polymer solids content in organic solvent of a polymer of 40% methyl methacrylate, 33% butyl methacrylate, 5% diethylamino ethyl methacrylate, 7% hydroxy ethyl acrylate and 15% vinyl oxazoline ester of linseed oil fatty acids and has a calculated weight average molecular weight of about 36,000.

A blue mill base was prepared by charging the following constituents into a ball mill and grinding the constituents until the pigments were thoroughly dispersed:

|  | Parts by Weight |
|---|---|
| Dispersing acrylic resin solution (described above) | 32.90 |
| Xylene | 30.22 |
| Toluene | 29.18 |
| "Monastral" blue pigment | 7.70 |
| Total | 100.00 |

A green mill base was prepared by charging the following constituents into a sandmill and grinding the constituents until the pigments were thoroughly dispersed:

|  | Parts by Weight |
|---|---|
| Dispersing acrylic resin solution (described above) | 44.23 |
| Xylene | 26.09 |
| Butyl acetate | 7.29 |
| Aliphatic hydrocarbon solvent | 26.09 |
| "Monastral" green pigment |  |
| Total | 114.20 |

An aluminum flake mill base was prepared by thoroughly mixing the following:

|  | Parts by Weight |
|---|---|
| Dispersing acrylic resin solution (described above) | 55.08 |
| Xylene | 7.42 |
| Butyl acetate | 6.00 |
| Aliphatic hydrocarbon solvent | 13.50 |
| Medium coarse aluminum paste | 18.00 |
| Total | 100.00 |

A composite mill base was prepared by blending together the following:

|  | Parts by Weight |
|---|---|
| Blue mill base (prepared above) | 180 |
| Green mill base (prepared above) | 400 |
| Aluminum flake mill base (prepared above) | 600 |
| Total | 1180 |

A coating composition was prepared by thoroughly blending the following constituents:

|  | Parts by Weight |
|---|---|
| Composite mill base | 59 |
| Acrylic polymer solution (prepared above) | 76 |
| Iminated acrylic polymer solution (40% solids in solvent blend of isopropanol, toluene, ethyl acetate of a polymer of 81% methyl methacrylate, 14.6% ethyl acrylate, 4.4% methacrylic acid postiminated with 2.91% propyleneimine and having a weight average molecular weight of about 60,000 determined by gel permeation chromatography using polymethyl methacrylate as a standard) | 229 |
| Butyl benzyl phthalate | 14 |
| Total | 378 |

A control coating composition A was prepared by blending the following constituents:

|  | Parts by Weight |
|---|---|
| Alkyd resin solution (55% solids of 41.6% linseed oil fatty acids/pentaerythritol, 15% pentaerythritol benzoate, 39.4% pentaerythritol phthalate and 4% pentaerythritol and has a weight average molecular weight of about 12,000 organic solvents) | 232 |
| Composite mill base (prepared above) | 116 |
| Acrylic vinyloxazoline ester polymer solution (58% solids) | 270 |
| Turpentine | 8 |
| Aromatic hydrocarbon solvent (boiling point range 182–219° C.) | 39 |
| Drier solution (mixture of 36.56% cobalt naphthenate, 4.45% manganese naphthenate and 35.29% zirconium octoate in 23.7% xylene) | 8 |
| Xylene | 75 |
| Aromatic controlled V.M. & P Naphtha | 43 |
| Total | 791 |

An isocyanate additive was prepared by blending the following:

|  | Parts by Weight |
|---|---|
| Portion I |  |
| Ethyl acetate | 90.0 |
| Diethylene glycol monobutyl ether | 54.0 |
| Toluene | 27.0 |
| Trixylenyl phosphate | 72.0 |
| Portion II |  |
| 2-[2'-hydroxy-3', 5'-1 (1-1dimethyl-propyl)phenyl] benzotriazole | 27.0 |
| Portion III |  |
| Polyisocyanate (biuret of hexamethylene diisocyanate) | 630.0 |
| Total | 900.0 |

A control coating composition B was prepared by blending about 1 part by volume of the above isocyanate additive with 8 parts by volume of coating composition A.

Each of the above coating composition was sprayed onto separate sets of phosphatized primed steel panels and dried at ambient temperatures.

The following tests were conducted on the panels and the results are recorded in the table.

Drying Time—time after application in hours in which a cotton ball will not adhere to the coating Tape Drying Time—time in hours after application in which masking tape will not mark the coating Gasoline Xylene Resistance—time after application in and which coating is resistant to particular solvent Adhesion (Dry)—After 2 hours drying, the coating was cut through in cross hatch pattern, tape placed over pattern and pulled off rating 0–10. 10-no coating pulled off, below 7 not acceptable and 0 all of coating pulled off Blistering—panel exposed to 100% relative humidity at 38° C. for 96 hours and coating examined for blisters.

Wet Adhesion—panel exposed as above and adhesion measured as above. Same rating is used.

|  | Coating Composition | Control Coating Composition A | Control Coating Composition B |
|---|---|---|---|
| Drying time (Hrs.) | 1 | 1½ | 2 |
| Tape Marking Time (Hrs.) | 2 | 2 | 2 |
| Gasoline Resistance (Hrs.) | 2 | 4 | 3 |
| Xylene Resistance | 1 Week Moderate Attack | 24 Hrs. | 48 Hrs. |
| Methyl isobutyl ketone Resistance | 1 week Moderate Attack | 1 week Slight Swelling | 1 week Slight Swelling |
| Adhesion (Dry) | 10 | 10 | 10 |
| Blistering | None | None | None |
| Adhesion (Wet) | 10 | 10 | 10 |
| Gloss measured at 20° after 7 days | 58 | 73 | 78 |
| Hardness (knoops) after 7 days | 4.5 | 1.46 | 1.51 |
| Distinctness of Image after 7 days | 60 | 70 | 80 |
| Chip Resistance | 5 | 5 | 6 |
| Gloss at 20° accelerated weathering (QUV) |  |  |  |
| 2 weeks | 18 | 19 NC | 27 NC |
| 4 weeks | 1 C Moderate | 2 NC | 3 NC |
| 6 weeks | 1 C Moderate | 2 NC | 3 NC |

NC No checking of coating
C Checking of coating

We claim:

1. A coating composition comprising 20–80% by weight of a binder and 80–20% by weight of a solvent for the binder, wherein the binder consists essentially of about:

A. an acrylic amino ester polymer consisting essentially of polymerized monomers of methyl methacrylate and monomers selected from the group consisting of alkyl methacrylate and alkyl acrylate each having 2–12 carbon atoms in the alkyl group and said polymer having pendent amino ester or hydroxy amino ester groups wherein the amine group is primary; and B. an acrylic polymer having pendent polymerizable ethylenically unsaturated groups consisting essentially of polymerized monomers of methyl methacrylate, an alkyl acrylate or an alkyl methacrylate each having 2–12 carbon atoms in the alkyl group, a hydroxy alkyl acrylate or a hydroxy alkyl methacrylate, each having 2–4 carbon atoms in the alkyl group and an isocyanato alkyl methacrylate or an acrylate each having 2–4 carbon atoms in the alkyl group;

said polymers having a weight average molecular weight of about 6,000–80,000 determined by gel permeation chromatography using polymethyl methacrylate as a standard.

2. The coating composition of claim 1 containing pigments in a pigment-to-binder weight ratio of 1:100 to 200:100.

3. The coating composition of claim 1 in which the acrylic amino ester polymer consists essentially of about 75–85% by weight, based on the acrylic amino ester polymer, of methyl methacrylate, 8–24% by weight, based on the weight of the acrylic amino ester polymer, of ethyl acrylate and 1–7% by weight, based on the weight of the acrylic amino ester polymer of methacrylic acid; said polymer reacted with an alkylene imine to provide amino ester groups pendent from the carbon-carbon polymer backbone of the formula

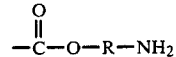

where R is an alkylene group having 2–3 carbon atoms.

4. The coating composition of claim 1 in which the acrylic polymer having pendent polymerizable ethylenically unsaturated groups consists essentially of 25–85% by weight, based on the weight of the acrylic polymer, of methyl methacrylate, 7–40% by weight, based on the weight of the acrylic polymer, of an alkyl methacrylate or alkyl acrylate having 2–12 carbon atoms in the alkyl group, 2–20% by weight, based on the weight of the acrylic polymer, of a hydroxy alkyl acrylate or a hydroxy alkyl methacrylate each having 2–4 carbon atoms in the alkyl group and 1–15% by weight, based on the weight of the acrylic polymer, of isocyanato alkyl methacrylate or isocyanato alkyl acrylate having 2–8 carbon atoms in the alkyl group; wherein the isocyanato group is reacted with the hydroxyl group of said hydroxy alkyl acrylate or hydroxy alkyl methacrylate to provide the acrylic polymer with pendent polymerizable ethylenically unsaturated groups.

5. The coating composition of claim 1 in which the acrylic amino ester polymer consists essentially of 40–50% by weight, based on the weight of the acrylic amino ester polymer, of methyl methacrylate, 25–45% by weight, based on the weight of the acrylic amino ester polymer, of butyl methacrlyate or lauryl methacrylate and 5–20% by weight, based on the weight of the acrylic amino ester polymer, of glycidyl methacrylate, said polymer being reacted with ammonia to provide hydroxy amino ester groups pendent from the carbon-carbon polymer backbone of the formula

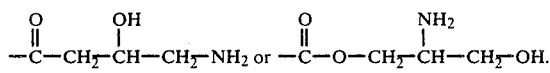

6. The coating composition of claim 1 containing in addition to the binder: 1–10% by weight, based on the weight of the binder, of a plasticizer.

7. The coating composition of claim 1 containing in addition to the binder about 0.1–5% by weight, based on the weight of the binder, of ultraviolet light stabilizer.

8. The coating composition of claim 1 containing pigments in a pigment-to-binder weight ratio of about 1:100 to 200:100, wherein the binder consists essentially of:
  A. about 50–90% by weight, based on the weight of the binder of the acrylic amino ester polymer consisting essentially of about 75–85% by weight, based on the weight of the acrylic amino ester polymer, of methyl methacrylate, 8–24% by weight, based on the weight of the acrylic amino ester, of ethyl acrylate and 1–7% by weight, based on the weight of the acrylic amino ester polymer of methacrylic acid: said polymer reacted with an alkylene imine to provide amino ester groups pendent from the carbon-carbon polymer backbone of the formula

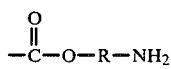

where R is an alkylene group having 2–3 carbon atoms; and
  B. about 10–50% by weight, based on the weight of the binder, of the acrylic polymer having pendent polymerizable ethylenically unsaturated groups consisting essentially of 25–85% by weight, based on the weight of the acrylic polymer, of methyl methacrylate, 7–40% by weight, based on the weight of the acrylic polymer, of an alkyl methacrylate having 2–12 carbon atoms in the alkyl group, 2–20% by weight, based on the weight of the acrylic polymer, of a hydroxy alkyl acrylate or a hydroxy alkyl methacrylate each having 2–4 carbon atoms in the alkyl group and 1–15% by weight, based on the weight of the acrylic polymer, of isocyanate alkyl methacrylate or isocyanato alkyl acrylate; wherein the isocyanato group is reacted with the hydroxyl group of said hdyroxy alkyl acrylate or hydroxy alkyl methacrylate to provide the acrylic polymer with pendent polymerizable ethylenically unsaturated groups and the composition contains in addition about 0.1–5% by weight, based on the weight of the binder, of ultraviolet light stabilizer.

9. The coating composition of claim 8 containing in addition to the binder about 1–10% by weight, based on the weight of the binder, of butyl benzyl phthalate plasticizer.

10. The coating composition of claim 1 containing pigments in a pigment-to-binder weight ratio of about 1:100 to 200:100, wherein the binder consists essentially of
  A. about 50–90% by weight, based on the weight of the binder, of the acrylic amino ester polymer consisting essentially of 40–50% by weight, based on the weight of the acrylic polymer, of methyl methacrylate, 25–45% by weight, based on the weight of the acrylic polymer, of lauryl methacrylate and 5–20% by weight, based on the weight of the acrylic polymer, of glycidyl methacrylate, said polymer reacted with ammonia to provide hydroxy amino ester groups pendent from the carbon-carbon polymer backbone of the formula

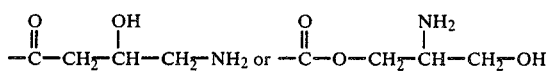

B. about 10–50% by weight, based on the weight of the binder, of the acrylic polymer having pendent polymerizable ethylenically unsaturated groups consisting essentially of 25–85% by weight, based on the weight of the acrylic polymer, of methyl methacrylate, 7–40% by weight, based on the the weight of the acrylic polymer, of an alkyl methacrylate having 2–12 carbon atoms in the alkyl group, 2–20% by weight, based on the weight of the acrylic polymer, of a hydroxy alkyl acrylate or hydroxy alkyl methacrylate each having 2–4 carbon atoms in the alkyl group and 1–15% by weight, based on the weight of the acrylic polymer of isocyanato alkyl methacrylate or isocyanato alkyl acrylate; wherein the isocyanato group is reacted with the hydroxyl group of said hydroxy alkyl acrylate or hydroxy alkyl methacrylate to provide the acrylic polymer with pendent polymerizable ethylenically unsaturated groups; and the composition contains in addition about 0.1–5% by weight, based on the weight of the binder, of ultraviolet light stabilizer.

11. A two-component composition comprising components (A) and (B), wherein said components are blended together to form a coating composition comprising 20–80% by weight binder and 80–20% by weight of solvent for the binder and wherein
  component (A) consists of 50–90% by weight of the binder and consists essentially of an acrylic amino ester polymer consisting essentially of polymerized monomers of methyl methacrylate and monomers selected from the group consisting of alkyl methacrylate and alkyl acrylate each having 2–12 carbon atoms in the alkyl group and said polymer having pendent amino ester of hydroxy amino ester groups wherein the amine group is a primary; and
  component (B) consists of an acrylic polymer having pendent polymerizable ethylenicallly unsaturated groups consisting essentially of polymerized monomers of methyl methacrylate, an alkyl acrylate or an alkyl methacrylate each having 2–12 carbon atoms in the alkyl group, a hydroxy alkyl acrylate or a hydroxy alkyl methacrylate, each having 2–4 carbon atoms in the alkyl group and an isocyanato alkyl methacrylate or an acrylate each having 2–4 carbon atoms in the alkyl group;
  said polymers having a weight average molecular weight of about 6,000–80,000 determined by gel permeation chromotography using polymethyl methacrylate as a standard;
  wherein the amine groups of the acrylic amino ester polymer react with the pendent polymerizable unsaturated groups to form a crosslinked finish on application of the composition to a substrate.

* * * * *